(12) United States Patent
Burdick et al.

(10) Patent No.: US 11,194,826 B2
(45) Date of Patent: *Dec. 7, 2021

(54) SINGLE-PASS DISTRIBUTED SAMPLING FROM BLOCK-PARTITIONED MATRICES

(71) Applicant: International Business Machines Corporation, Armonk, NY (US)

(72) Inventors: Douglas R. Burdick, San Jose, CA (US); Alexandre V. Evfimievski, San Jose, CA (US); Berthold Reinwald, San Jose, CA (US); Sebastian Schelter, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/271,485

(22) Filed: Feb. 8, 2019

(65) Prior Publication Data
US 2019/0171641 A1    Jun. 6, 2019

Related U.S. Application Data

(63) Continuation of application No. 14/948,212, filed on Nov. 20, 2015, now Pat. No. 10,229,168.

(51) Int. Cl.
*G06F 16/24* (2019.01)
*G06F 16/2458* (2019.01)

(52) U.S. Cl.
CPC .............................. *G06F 16/2465* (2019.01)

(58) Field of Classification Search
CPC .......................... G06F 16/2465; G06F 16/182
See application file for complete search history.

(56) References Cited

U.S. PATENT DOCUMENTS

| | | | |
|---|---|---|---|
| 7,567,949 B2 | 7/2009 | Chaudhuri et al. | |
| 7,797,326 B2 | 9/2010 | Gopalan et al. | |
| 8,312,399 B2 | 11/2012 | Fang et al. | |
| 8,321,579 B2 | 11/2012 | Aggarwal et al. | |
| 8,356,086 B2 * | 1/2013 | Liu ........................ | G06F 17/16 709/220 |
| 8,489,645 B2 | 7/2013 | Mihaila et al. | |
| 8,868,470 B2 | 10/2014 | Xu et al. | |

(Continued)

OTHER PUBLICATIONS

List of IBM Patents Or Patent Applications Treated As Related.
(Continued)

*Primary Examiner* — Apu M Mofiz
*Assistant Examiner* — Cindy Nguyen
(74) *Attorney, Agent, or Firm* — Zilka-Kotab, P.C.

(57) ABSTRACT

A computer-implemented method is provided that includes identifying an input dataset formatted as an input matrix, the input matrix including a plurality of rows and a plurality of columns. The computer-implemented method also includes dividing the input matrix into a plurality of input matrix blocks. Further, the computer-implemented method includes distributing the input matrix blocks to a plurality of different machines across a distributed filesystem, and sampling, by at least two of the different machines in parallel, at least two of the input matrix blocks. Finally, the computer-implemented method includes generating at least one sample matrix based on the sampling of the at least two of the input matrix blocks.

15 Claims, 12 Drawing Sheets

(56) References Cited

U.S. PATENT DOCUMENTS

| | | | |
|---|---|---|---|
| 10,229,168 B2 | 3/2019 | Burdick et al. | |
| 2006/0085497 A1 | 4/2006 | Sehitoglu | |
| 2009/0162888 A1* | 6/2009 | Schmidt | G01N 33/58 435/29 |
| 2011/0320184 A1 | 12/2011 | Beyer et al. | |
| 2015/0378962 A1* | 12/2015 | Golovashkin | G06K 9/6267 708/607 |
| 2017/0060988 A1* | 3/2017 | Kudo | G06F 16/258 |
| 2017/0147673 A1 | 5/2017 | Burdick et al. | |

OTHER PUBLICATIONS

Alexandrov et al., "Myriad: Scalable and Expressive Data Generation," Proceedings of the VLDB Endowment, vol. 5, No. 12, Aug. 2012, pp. 1890-1893.

Manku et al., "Approximate Frequency Counts Over Data Streams," Proceedings of the 28th International Conference on Very Large Data Bases, Aug. 20, 2002, 12 pages.

Geisser, S., "The Predictive Sample Reuse Method with Applications," Journal of the American Statistical Association, vol. 70, No. 350, Jun. 1975, pp. 320-328.

Efron et al., "Improvements on cross-validation: the 632+ bootstrap method," Journal of the American Statistical Association, vol. 92, No. 438, Jun. 1997, pp. 548-560.

Burman, P., "A comparative study of ordinary cross-validation, v-fold cross-validation and the repeated learning-testing methods," Biometrika, vol. 76, No. 3, Sep. 1989, pp. 503-514.

Lin et al. "Large-scale machine learning at twitter," Proceedings of the 2012 ACM SIGMOD International Conference on Management of Data, May 20, 2012, pp. 793-804.

Breiman, L., "Bagging Predictors," Machine Learning, vol. 24, No. 2, Aug. 1996, pp. 123-140.

Ghoting et al., "SystemML: Declarative machine learning on MapReduce," Proceedings of the 2011 IEEE 27th International Conference on Data Engineering, Apr. 2011, pp. 231-242.

Sparks et al., "Mli: An api for distributed machine learning," 2013 IEEE International Conference on Data Mining, Dec. 2013, 12 pages.

Anonymous, "Apache Mahout," Apache Software Foundation, Aug. 7, 2015, pp. 1-3.

Huang et al., "Cumulon: optimizing statistical data analysis in the cloud," SIGMOD 2013, Jun. 22-27, 2013, 12 pages.

Kang et al., "Pegasus: A peta-scale graph mining system implementation and observations," Proceedings of the 2009 Ninth IEEE International Conference on Data Mining, Dec. 2009, 10 pages.

Panda et al., "PLANET: Massively Parallel Learning of Tree Ensembles with MapReduce," Proceedings of the 35th International Conference on Very Large Data Bases, Aug. 2009, 12 pages.

Boehm et al., "Hybrid Parallelization Strategies for Large-Scale Machine Learning in SystemML," Proceedings of the VLDB Endowment, vol. 7, No. 7, Mar. 2014, pp. 553-564.

Kraska et al., "MLbase: A Distributed Machine-learning System," CIDR 2013, Jan. 2013, 7 pages.

Davis, C., "The computer generation of multinomial random variates," Computational statistics & data analysis, vol. 16, No. 2, Aug. 1993, pp. 205-217.

Ghazal, A., "BigBench: Towards an Industry Standard Benchmark for Big Data Analytics," SIGMOD 2013, Jun. 2013, 12 pages.

Anonymous, "Apache Hadoop," Apache Software Foundation, Oct. 30, 2015, pp. 1-3.

Battre et al., "Nephele/pacts: a programming model and execution framework for web-scale analytical processing," SoCC 2010, Jun. 2010, 12 pages.

Zaharia et al., "Resilient distributed datasets: A fault-tolerant abstraction for in-memory cluster computing," NSDI 2012, Jul. 2012, 14 pages.

Borkar et al., "Hyracks: A flexible and extensible foundation for data-intensive computing," ICDE 2011, Apr. 2011, 12 pages.

Koren et al., "Matrix factorization techniques for recommender systems," Computer, Aug. 2009, pp. 40-48.

Bishop et al., "Pattern recognition and machine learning," Information Science and Statistics, 2006, 703 pages.

Schafer, J., "Analysis of incomplete multivariate data," Monographs on Statistics and Applied Probability, CRC, Aug. 1, 1997, 444 pages.

Cohen et al., "Mad skills: new analysis practices for big data," PVLDB 2009, Aug. 2009, 12 pages.

Thusoo et al., "Hive: a warehousing solution over a map-reduce framework," PVLDB 2009, vol. 2, No. 2, Aug. 2009, 4 pages.

RDC Team, "R: A Language and Environment for Statistical Computing," The R Development Core Team, Version 2.6.0, Oct. 3, 2007, 1555 pages.

Pedregosa et al., "Scikit-learn: Machine learning in python," JMLR 2011, vol. 12, Oct. 2011, pp. 2825-2830.

Low et al., "Distributed graphlab: a framework for machine learning and data mining in the cloud," PVLDB 2012, vol. 5, No. 8, Aug. 2012, pp. 716-727.

Grover et al., "Extending map-reduce for efficient predicate-based sampling," ICDE 2012, Apr. 2012, 12 pages.

Kleiner et al., "A scalable bootstrap for massive data," Cornell University Library, Dec. 2011, pp. 1-24.

Schafer, J.L., "Analysis of Incomplete Multivariate Data (Monographs on Statistics & Applied Probability 72)," Chapman & Hall/CRC, Chapter 7, Aug. 1, 1997, pp. 239-287.

Burdick et al., U.S. Appl. No. 14/948,212, filed Nov. 20, 2015.

Non-Final Office Action from U.S. Appl. No. 14/948,212, dated Jan. 12, 2018.

Final Office Action from U.S. Appl. No. 14/948,212, dated Jul. 27, 2018.

Notice of Allowance from U.S. Appl. No. 14/948,212, dated Oct. 16, 2018.

* cited by examiner

SINGLE-PASS DISTRIBUTED SAMPLING FROM BLOCK-PARTITIONED MATRICES

BACKGROUND

The present invention relates to distributed sampling, and more particularly, this invention relates to sampling using block-partitioned matrices.

When conducting advanced analysis, such as cross-validation (CV) and ensemble learning (EL), random samples of data must be generated for conducting the analysis. In order to support the wide range of sampling techniques that may be required for the most-used CV and EL approaches, it is necessary to have a general framework for sampling that supports a wide variety of sampling techniques.

The most complicated form of sampling is sampling with replacement, where one or more samples are taken from a given dataset, and then replaced. This is further complicated in the big data setting, where the dataset is commonly stored in a distributed, blocked format.

Sampling with replacement in a big data setting is problematic for several reasons. First, a single assignment table must be materialized in a manner that maps observations to positions in the samples. Second, distributed join operations between data matrices and assignment tables may introduce inefficiencies. Finally, re-blocking must be done differently depending on the join strategy, and re-blocking the join results utilizes significant resources.

SUMMARY

In one general embodiment, a computer-implemented method is provided that includes identifying an input dataset formatted as an input matrix, the input matrix includes a plurality of rows and a plurality of columns. The computer-implemented method also includes dividing the input matrix into a plurality of input matrix blocks. Further, the computer-implemented method includes distributing the input matrix blocks to a plurality of different machines across a distributed filesystem, and sampling, by at least two of the different machines in parallel, at least two of the input matrix blocks. Finally, the computer-implemented method includes generating at least one sample matrix based on the sampling of the at least two of the input matrix blocks.

In another general embodiment, a computer program product is provided for performing single-pass distributed sampling from block-partitioned matrices. The computer program product comprises a computer readable storage medium having program instructions embodied therewith. The program instructions are executable by a processor to cause the processor to identify an input dataset formatted as an input matrix, the input matrix including a plurality of rows and a plurality of columns. The program instructions are further executable by the processor to cause the processor to divide the input matrix into a plurality of input matrix blocks, and distribute the input matrix blocks to a plurality of different machines across a distributed filesystem. At least two of the different machines sample, in parallel, at least two of the input matrix blocks. Moreover, the program instructions are executable by the processor to cause the processor to generate at least one sample matrix based on the sampling of the at least two of the input matrix blocks.

In another general embodiment, a system is provided that includes one or more processors and logic integrated with and/or executable by the processors. The logic is configured to identify an input dataset formatted as an input matrix that includes a plurality of rows and a plurality of columns. Also, the logic is configured to divide the input matrix into a plurality of input matrix blocks, and distribute the input matrix blocks to a plurality of different machines across a distributed filesystem. Moreover, the logic is configured to sample, by at least two of the different machines in parallel, at least two of the input matrix blocks, and generate at least one sample matrix based on the sampling of the at least two of the input matrix blocks.

DETAILED DESCRIPTION

Figure 1:
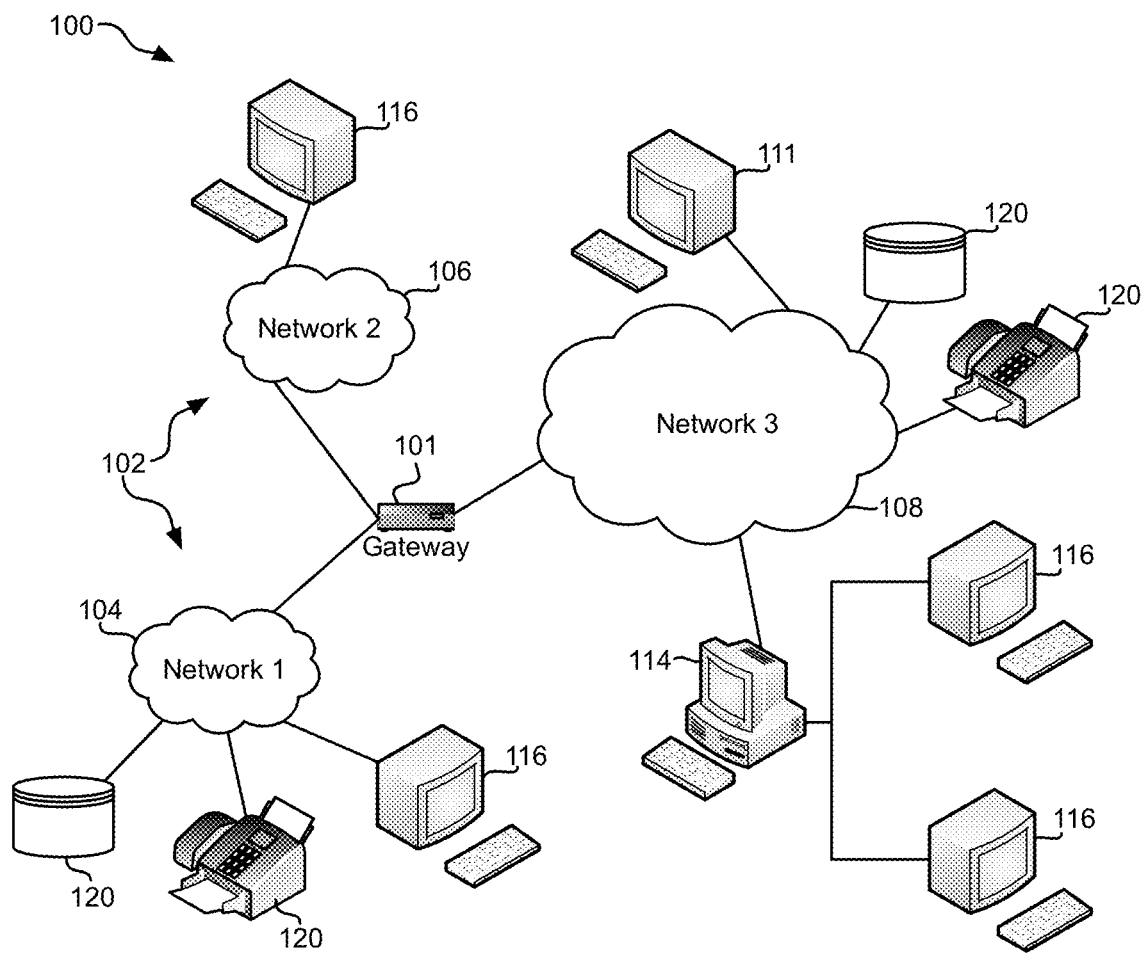
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments for performing single-pass distributed sampling from block-partitioned matrices.

In one general embodiment, a computer-implemented method is provided that includes identifying an input dataset formatted as an input matrix, the input matrix includes a plurality of rows and a plurality of columns. The computer-implemented method also includes dividing the input matrix into a plurality of input matrix blocks. Further, the computer-implemented method includes distributing the input matrix blocks to a plurality of different machines across a distributed filesystem, and sampling, by at least two of the different machines in parallel, at least two of the input matrix blocks. Finally, the computer-implemented method includes generating at least one sample matrix based on the sampling of the at least two of the input matrix blocks.

In another general embodiment, a computer program product is provided for performing single-pass distributed sampling from block-partitioned matrices. The computer program product comprises a computer readable storage medium having program instructions embodied therewith. The program instructions are executable by a processor to cause the processor to identify an input dataset formatted as an input matrix, the input matrix including a plurality of rows and a plurality of columns. The program instructions are further executable by the processor to cause the processor to divide the input matrix into a plurality of input matrix blocks, and distribute the input matrix blocks to a plurality of different machines across a distributed filesystem. At least two of the different machines sample, in parallel, at least two of the input matrix blocks. Moreover, the program instructions are executable by the processor to cause the processor to generate at least one sample matrix based on the sampling of the at least two of the input matrix blocks.

In another general embodiment, a system is provided that includes one or more processors and logic integrated with and/or executable by the processors. The logic is configured to identify an input dataset formatted as an input matrix that includes a plurality of rows and a plurality of columns. Also, the logic is configured to divide the input matrix into a plurality of input matrix blocks, and distribute the input matrix blocks to a plurality of different machines across a distributed filesystem. Moreover, the logic is configured to sample, by at least two of the different machines in parallel, at least two of the input matrix blocks, and generate at least one sample matrix based on the sampling of the at least two of the input matrix blocks.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
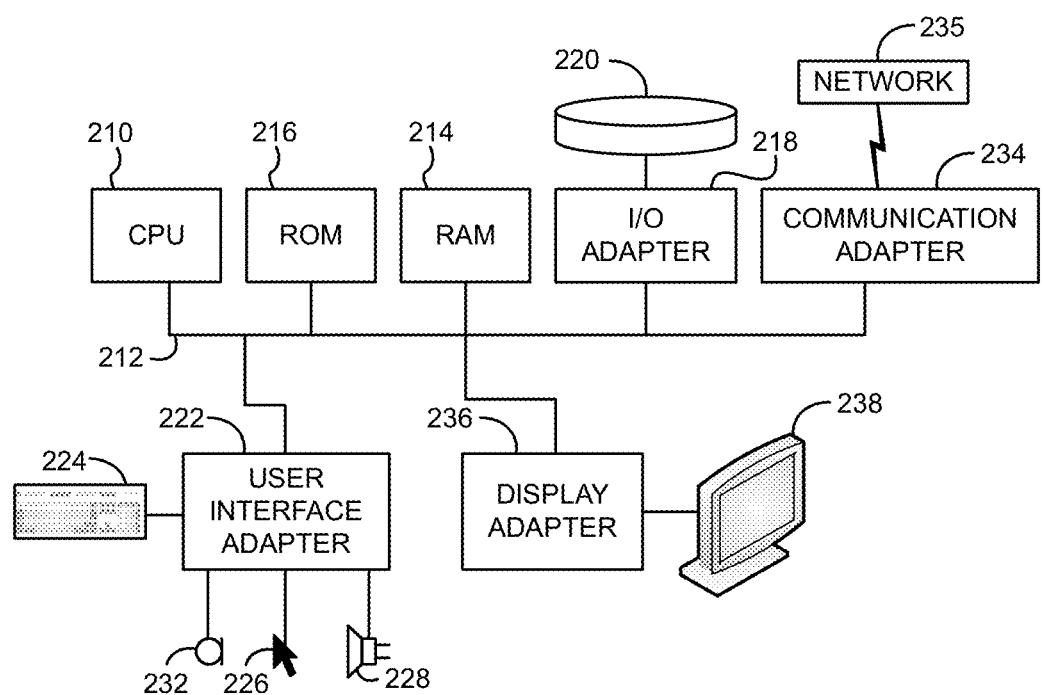
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3A:
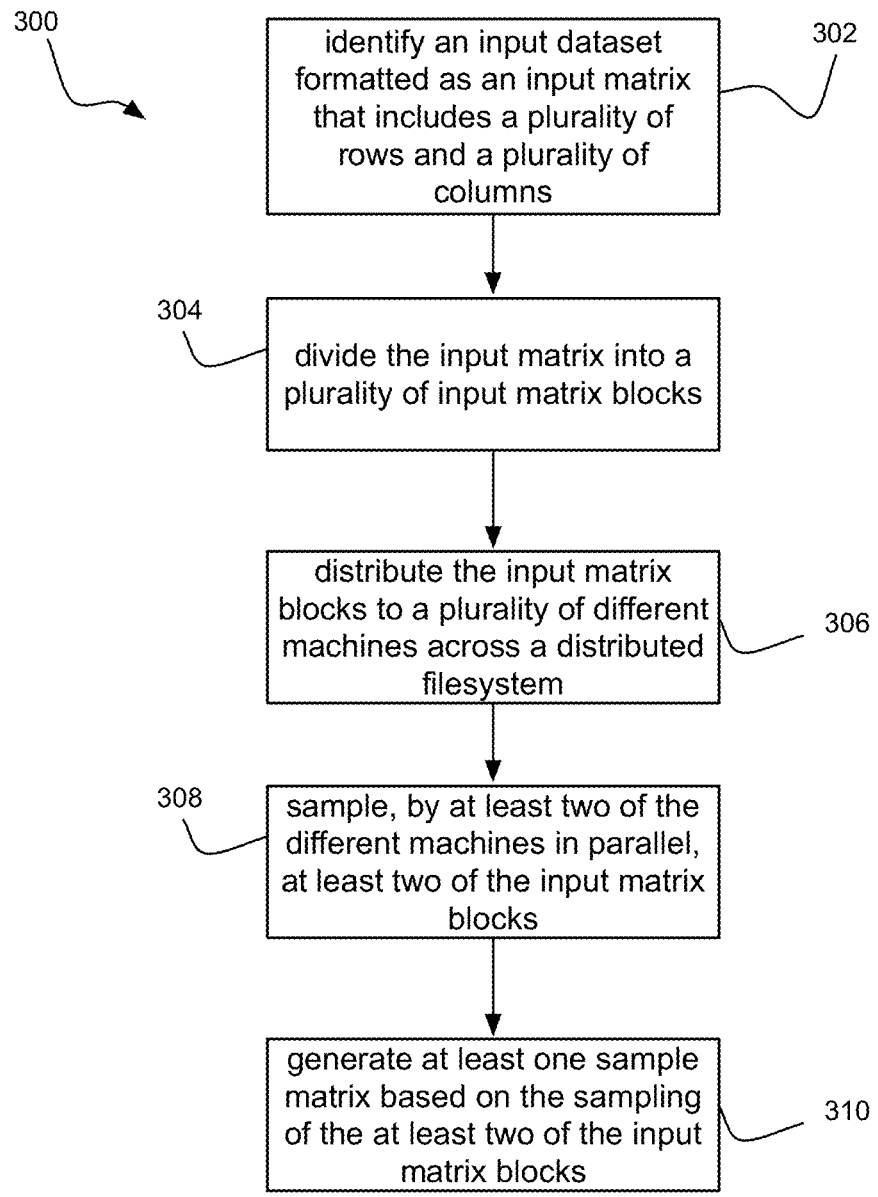
FIGS. 3A-3B illustrate a method for single-pass distributed sampling from block-partitioned matrices, according to one embodiment.

Now referring to FIG. 3A, a flowchart of a method 300 for single-pass distributed sampling from block-partitioned matrices, is shown according to one embodiment. The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Execution of the method 300 may proceed in a distributed data processing system, such as Hadoop, Stratosphere, Spark, Hyracks, etc., or in a distributed database that supports user-defined table functions (UDTFs) and/or user-defined aggregation functions (UDAFs).

As shown in FIG. 3A, the method 300 initiates with operation 302, where an input dataset is identified. The input dataset is formatted as an input matrix that includes a plurality of rows and a plurality of columns. As an option, the input matrix may comprise a distributed, blocked matrix. In some embodiments, the input matrix may be used for machine learning use cases. As used herein, the input dataset may comprise any aggregation of multiple instances of data. In one embodiment, the rows of the input matrix may correspond to observations, and the columns of the input matrix may correspond to features of the observations.

Figures 4A, 4B, 4C:
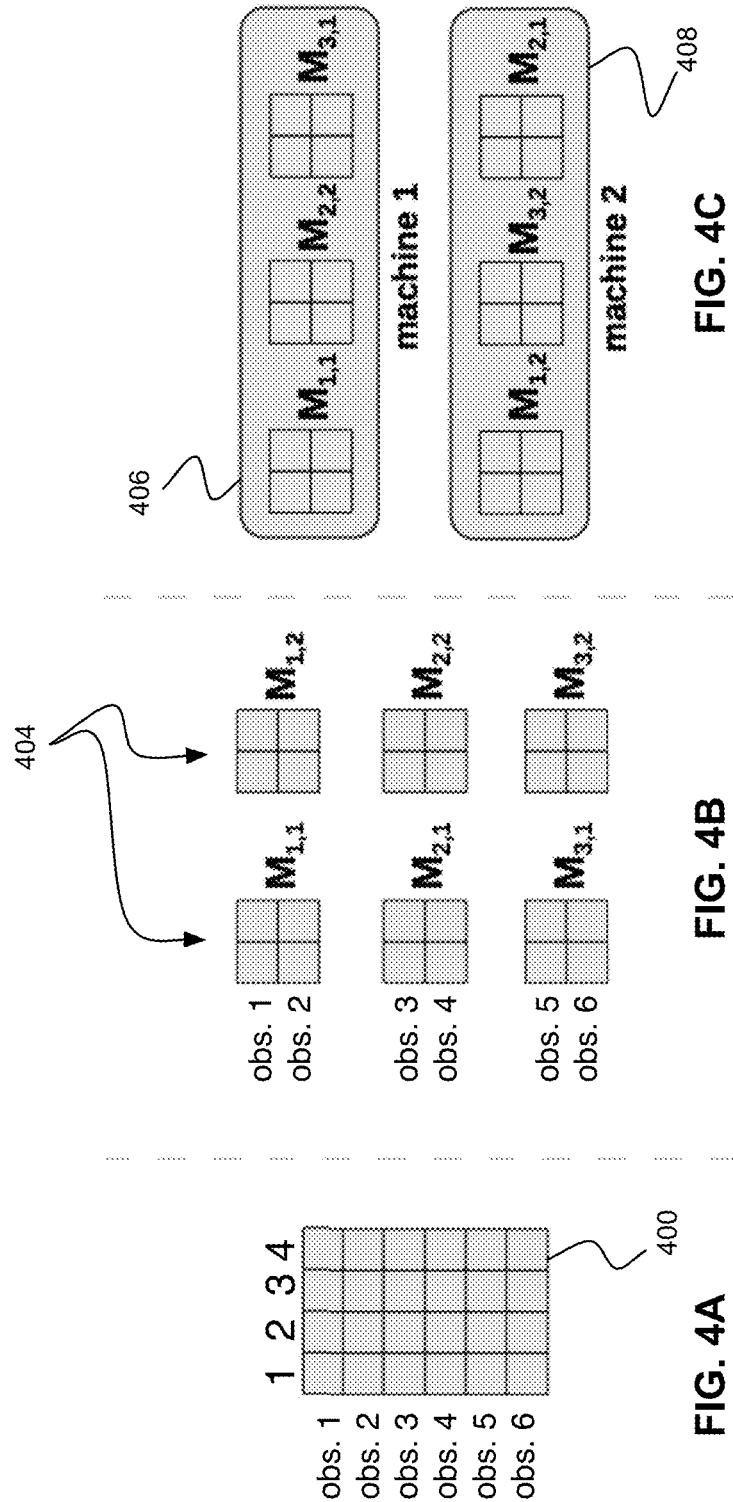
FIGS. 4A-4D illustrate the division and distribution of input matrix blocks of an input matrix, according to one embodiment.

For example, referring to FIG. 4A, an input matrix 400 is shown, according to one embodiment. In particular, the input matrix 400 is 6×4 matrix that represents a dataset. More specifically, the input matrix 400 comprises 6 rows or observations, and 4 features or columns per row. In such an embodiment, an element (i,j) of the input matrix may include a value of feature j for observation i.

For example, in the context of a spam detection scenario, each row (i.e., observation) of the input matrix may comprise a separate email, and each column of the input matrix corresponds to email features (e.g., occurrence count for a term "mortgage" in email text, label as spam or non-spam, etc.). Accordingly, in such an example, a given element may include a feature of a corresponding email.

The input matrix may include hundreds, thousands, millions, etc. of rows (observations), and hundreds, thousands, millions, etc. of columns (features).

Additionally, at operation 304, the input matrix is divided into a plurality of input matrix blocks. In one embodiment, each of the input matrix blocks is of a predetermined size. As an option, the input matrix blocks may comprise square blocks. Also, each of the input matrix blocks may be of the same size (e.g., width×height).

For example, referring now to FIG. 4B, the input matrix 400 has been divided into square input matrix blocks 404, where each of the input matrix blocks 404 is of a 2×2 block size. Of course, it is understood that any block size may be used. As a result of dividing the 6×4 input matrix 400 into 2×2 square blocks, six different blocks result, as shown in FIG. 4B.

In the description set forth below, the individual input matrix blocks are referred to using horizontal and vertical block indices. For example, $M_{2,1}$ denotes the input matrix block in the second row and first column of input matrix blocks, and $M_{3,2}$ denotes the input matrix block in the third row and second column of input matrix blocks.

Still yet, at operation 306, the input matrix blocks are distributed to a plurality of different machines across a distributed filesystem. In one embodiment, each of the machines may comprise different node of a cluster, such as, for example, a MapReduce cluster. In another embodiment, the machines may be nodes of a share-nothing cluster. As used herein, the distributed filesystem comprises any filesystem that may be shared or simultaneously mounted by each of the machines. In one embodiment, the distributed file system comprises the Hadoop Distributed File System (HDFS). The input matrix blocks may be distributed or assigned to the different machines at random.

For example, referring now to FIG. 4C, the input matrix blocks 404 have been assigned to either a first machine 406 or a second machine 408. In particular, input matrix blocks $M_{1,1}$, $M_{2,2}$, and $M_{3,1}$ have been assigned to the first machine 406, and input matrix blocks $M_{1,2}$, $M_{3,2}$, and $M_{2,1}$ have been assigned to the second machine 408. As a result, sampling of the input matrix blocks will be distributed in a manner such that the first machine 406 samples the input matrix blocks $M_{1,1}$, $M_{2,2}$, and $M_{3,1}$, and the second machine 408 samples the input matrix blocks $M_{1,2}$, $M_{3,2}$, and $M_{2,1}$, as discussed in more detail below.

For purposes of simplicity and clarity, only the two machines 406 and 408 are described in the following discussion, however it is understood that the input matrix blocks may be distributed to more than two machines. For example, the input matrix blocks may be distributed amongst tens, hundreds, or thousands, etc. of machines.

Next, at operation 308, at least two different machines, sample, in parallel, at least two of the input matrix blocks. In one embodiment, the sampling of the input matrix blocks may identify which rows of the input matrix occur within output sample matrices. More specifically, every machine that was distributed at least one input matrix block may process the locally stored input matrix blocks of the input matrix, and utilize a user-defined sampling function to sample partitions from the input matrix blocks. In particular, each machine may process each input matrix block it was distributed from the input matrix by iterating over the partitions contained in the input matrix block. For each such partition, the machine invokes the user-defined sampling function to determine the occurrences of this partition in the sample matrices.

In various embodiments, the partitions may comprise rows or columns. Although the discussion herein is primarily focused on generating sample matrices from rows of the input matrix, it is contemplated that the techniques disclosed herein apply equally to the generation of sample matrices from columns of the input matrix. Accordingly, for the sake of simplicity the following disclosure may consistently refer to rows, and partitions of rows, but it is understood that the disclosure is equally applicable to columns and partitions of columns.

In various embodiments, the user-defined sampling function may return tuples that identify the sample matrix and position of the observation. For every (samplematrix_id, relative_pos) tuple returned by the user-defined sampling function, the processing machine emits a record. Accordingly, sampling the at least two of the input matrix blocks includes, by each of the at least two of the different machines in parallel, for each of the input matrix blocks stored at the machine: reading the input matrix block by iterating over partitions of the input matrix block, for each of the partitions of the input matrix block, determining occurrences of the partition in the at least one sample matrix, and for each occurrence of one of the partitions in the at least one sample matrix, emitting a record.

Figure 3B:
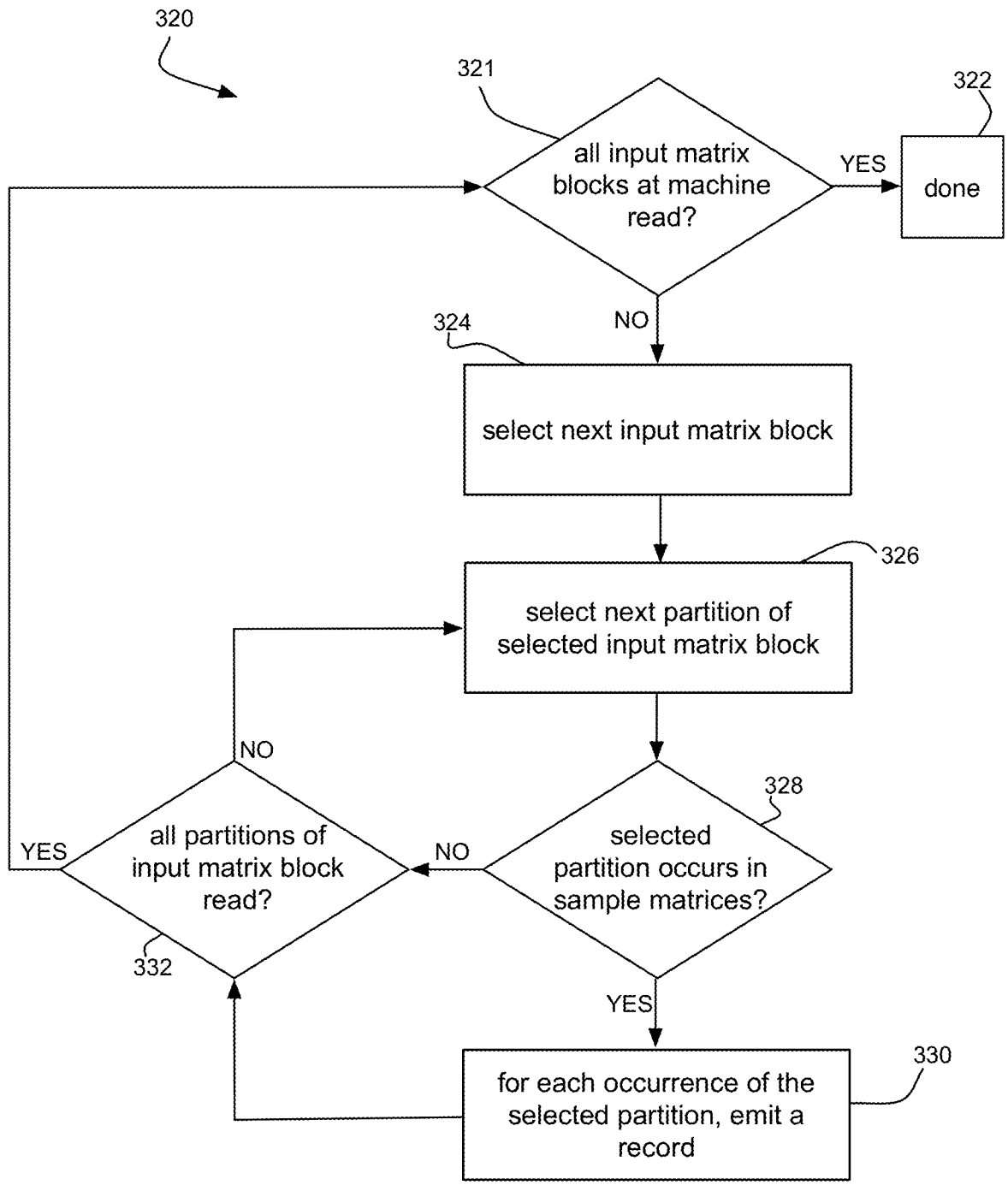

For example, referring to FIG. 3B, a flowchart of a method 320 for sampling the input matrix blocks of a machine, is shown according to one embodiment. The method 320 may be performed in accordance with the present invention in any of the environments depicted in FIGS. 1-2, among others, in various embodiments. Of course, more or less operations than those specifically described in FIG. 3B may be included in method 320, as would be understood by one of skill in the art upon reading the present descriptions.

In one embodiment, the method 320 may be performed by each machine that is sampling the input matrix blocks described in the context of operation 308 of FIG. 3A.

The method 320 may start at operation 321, where it is determined whether all input matrix blocks at the machine have been read. If all blocks have been read, or there are no input matrix blocks to sample, then the method may conclude at operation 322. However, if there is at least one input matrix block to be read, then the next input matrix block is selected at operation 324.

Further, at operation 326, a next partition of the selected input matrix block is selected. If the selected input matrix block has not yet been read, then this may be the first partition of the input matrix block. As noted above, the partitions may comprise rows or columns. Accordingly, a row or a column of the selected input matrix block may be selected for reading. At operation 328 it is determined whether the selected partition occurs in any sample matrices.

In one embodiment, it may be determined whether the selected partition (e.g., row, etc.) occurs in any of the sample matrices using a user-defined sampling function. For example, a "compute occurrences" function may be utilized to compute the number of occurrences of an observation in the sample matrices. In one embodiment, a compute occurrences function receives as input an observation identifier, and outputs a set of (sample identifier, position) tuples. The sample identifier identifies the sample matrix that the observation occurs in, and accordingly may also be herein referred to as a sample matrix identifier. As an option, one or more of the (sample identifier, position) tuples may be empty. A tuple may be empty if the row identified as the observation identifier is not included in any of the sample matrices.

Figure 4D:
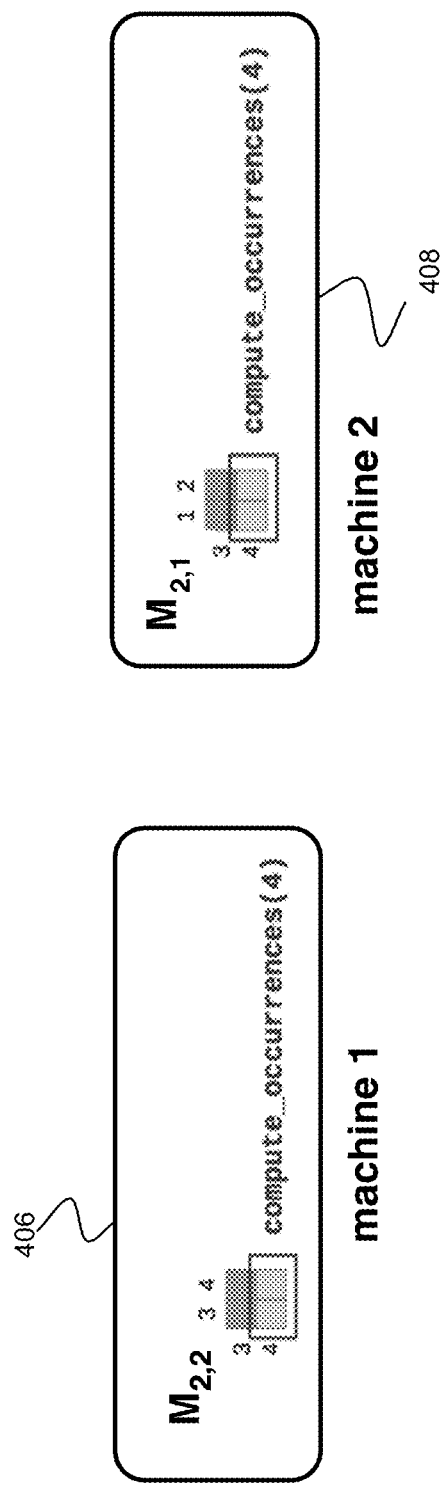

For example, referring to FIG. 4D, a compute_occurrences function has been called on both the first machine 406 and the second machine 408. Further, as shown in FIG. 4D, the compute_occurrences function has been called with the input of "4", where "4" is an observation identifier that identifies row 4 of the input matrix 400. As a result of the compute_occurrences function, each of the first machine 406 and the second machine 408 may output a tuple that identifies when and where the observation (e.g., row 4) occurs in the sample matrices.

In another embodiment, a compute occurrences function receives as input an observation identifier (i.e., a row identifier that identifies a particular row to process), a pseudo random number generator instantiated by an algorithm (i.e., for "skip-ahead" functionality), and a set of user-defined parameters, such as, for example, the number of samples to draw. Again, in response, to the input, a set of (sample identifier, position) tuples may be output in response, where the sample identifier identifies a sample matrix, and the position may be a relative position, between 0 and 1, used to determine the absolute position of the occurrence in the sample.

Each tuple dictates an occurrence of the row in a sample matrix denoted by the sample matrix identifier. This may allow for the generation of occurrences in different sample matrices with a single invocation. Also, where the position is a relative position, the relative position may be used to determine the order of the rows in the sample matrices by sorting them according to relative position. As an option, a sample matrix may be randomized by setting the position to a random number drawn from a random number generator. Using such a compute occurrences function may obviate the need for a sequentially generated and materialized assignment table.

The observation identifier may be used as a position to skip to in a random number sequence, and pseudo random number generators may be used to skip to an arbitrary position in constant time. Further, the same seed may be used for all pseudo random number generators. In this manner, a single row or observation may be spread over several input matrix blocks that are distributed between multiple machines, and although the input matrix blocks may be processed on different machines, the compute occurrences function returns the same result for all parts of an observation without the need for inter-machine communication.

If the selected partition occurs in a sample matrix, then a record is emitted at operation 330. However, if the selected partition does not occur in a sample matrix, then no record is emitted, and it is determined, at operation 332, whether all partitions of the input matrix block have been read. If all partitions of the input matrix block have not been read, then a next partition of the input matrix block is selected at operation 326, and it is again determined whether this newly selected partition occurs in any of the sample matrices. However, if all partitions of the input matrix block have been read, then it is determined whether all input matrix blocks have been read at the machine at operation 321.

In this way, the method 320 may continue at each machine storing input matrix blocks until the machine has iterated through all rows/columns of the input matrix blocks stored at the machine and emitted records accordingly.

In one embodiment, each of the emitted records may be structured to include a sample matrix identifier that identifies a sample matrix, a vertical block index, a position, and a partial observation. The sample matrix identifier identifies a sample matrix in which the row or column being sampled will occur. The vertical block index is the vertical index of the input matrix block of the input matrix from which the row partition was sampled. The position may be a relative position. For example, the position may be a relative positional value between 0 and 1 from the tuple returned by the user-defined sampling function. The partial observation may comprise the portion of the row of the input matrix block used to generate the record (i.e., the relevant portion of the observation).

In one specific embodiment, the emitted records may conform to the following schema: [sampleMatrixID|verticalBlockIndex|position|partialObservation].

An algorithm for locally sampling from stored input matrix blocks and emitting records, according to one specific embodiment, is provided as pseudocode in Table 1. Of course, such pseudocode is provided as an option, and should not be construed as limiting in any manner.

TABLE 1

```
function findOccurrences(block) {
    # iterate over all rows of the block
    for (row in block.getRows( )) {
        observationID = row.index
        # compute occurrences
        occurrences = compute_occurrences(observationID)
        for (occurrence in occurrences) {
            # emit record for every occurrence
            record = new Record(occurrence.sampleID,
                block.verticalIndex,
                occurrence.position,
                row.contents)
            emit(record)
        }
    }
}
```

As an option, each of the records may further include a row identifier. The row identifier of a record may be the row index of the row that originated the row of the input matrix block used to generate the record (e.g., the i-th row has index i). Accordingly, in another specific embodiment, the emitted records may conform to the following schema: [sampleMatrixID|verticalBlockIndex|position|rowIndex|partialObservation].

An algorithm for locally sampling from stored input matrix blocks and emitting records, according to another embodiment, is provided as pseudocode in Table 2. Of course, such pseudocode is provided as an option, and should not be construed as limiting in any manner.

TABLE 2

Input: matrix block blk, random number generator rng, sampling parameters
params
    Output: records containing the sampled rows
v ← read vertical index of blk
for row_partition in blk
    j ← index of row
        for occ ← sampling_UDF( j, rng, params )
            emit record( occ.samplematrix_id, v,
            occ.relative_pos, j,
            row_partition )

Referring again to FIG. 3A, at least one sample matrix is generated, at operation 310, based on the sampling of the at least two input matrix blocks. In one embodiment, sample matrices may be generated by grouping the emitted records, sorting each of the groups of the emitted records, and re-blocking each of the sorted groups of the emitted records to materialize distributed blocked sample matrices. In other words, the at least one sample matrix may be materialized by re-blocking sorted groups of the emitted records. Accordingly, this operation may also be herein referred to as a re-blocking operation.

FIG. 5, depicts the emission, grouping, and sorting of records 502 (i.e., records 502a and records 502b) from machines (i.e., the first machine 406 and the second machine 408, respectively), in accordance with one embodiment. As an option, the emission, grouping, and sorting of the records 502 may be implemented in conjunction with features from any other embodiment listed herein, such as those described with reference to the other FIGS. Of course, however, the emission, grouping, and sorting of the records 502 and others presented herein may be used in various applications and/or in permutations which may or may not be specifically described in the illustrative embodiments listed herein. Further, the emission, grouping, and sorting of the records 502 presented herein may be used in any desired environment.

Figure 5A:
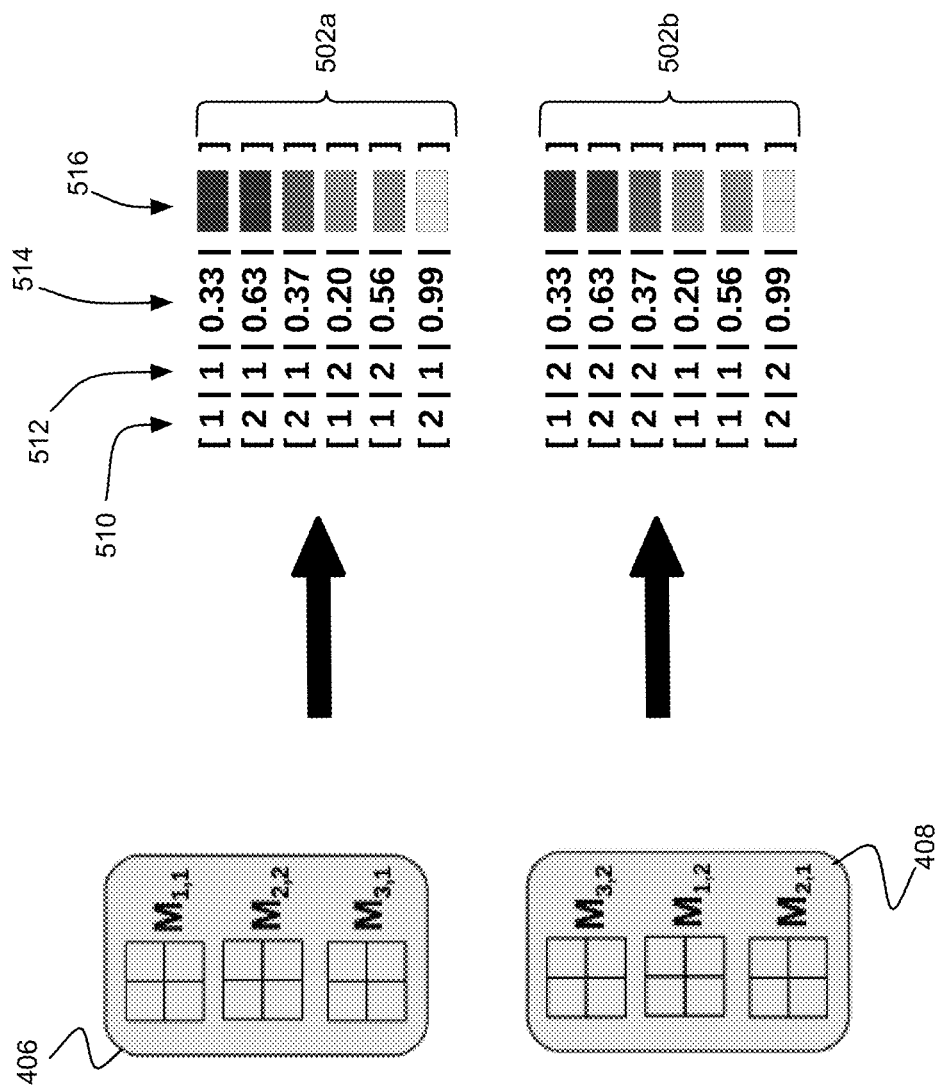
FIGS. 5A-5D illustrate the emission, grouping, and sorting of records, according to one embodiment.

As shown in FIG. 5A, the first machine 406 has emitted the records 502a. The records 502a may be emitted based on the calling of a compute occurrences function. Similarly, the second machine 408 has emitted the records 502b. The records 502b may be emitted based on the calling of the same compute occurrences function. As illustrated by FIG. 5A, each record includes a sample matrix identifier 510 that identifies a sample matrix, a vertical block index 512, a position 514, and a partial observation 516. The partial observation may comprise the data of the called observation that was stored in the input matrix block used to generate the record.

Figure 5B:
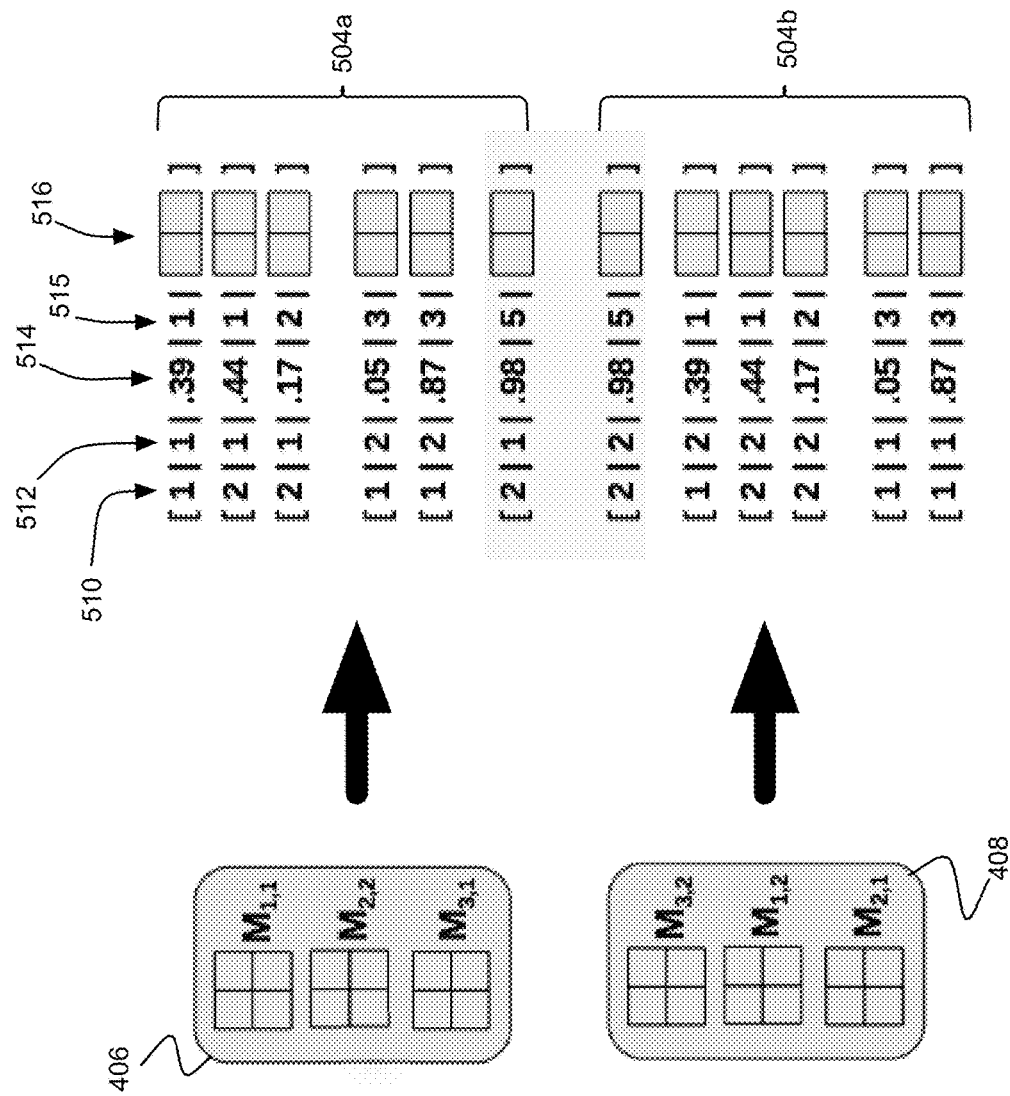

In another embodiment, and as illustrated by FIG. 5B, the first machine 406 has emitted the records 504a. The records 504a may be emitted based on the calling of a compute occurrences function. Similarly, the second machine 408 has emitted the records 504b. The records 504b may be emitted based on the calling of the same compute occurrences function. As illustrated by FIG. 5B, each record includes a sample matrix identifier 510 that identifies a sample matrix, a vertical block index 512, a position 514, a row index 515, and a partial observation 516. As an option, any compute occurrences functions may be executable in the map-phase of a MapReduce system.

Figure 5C:
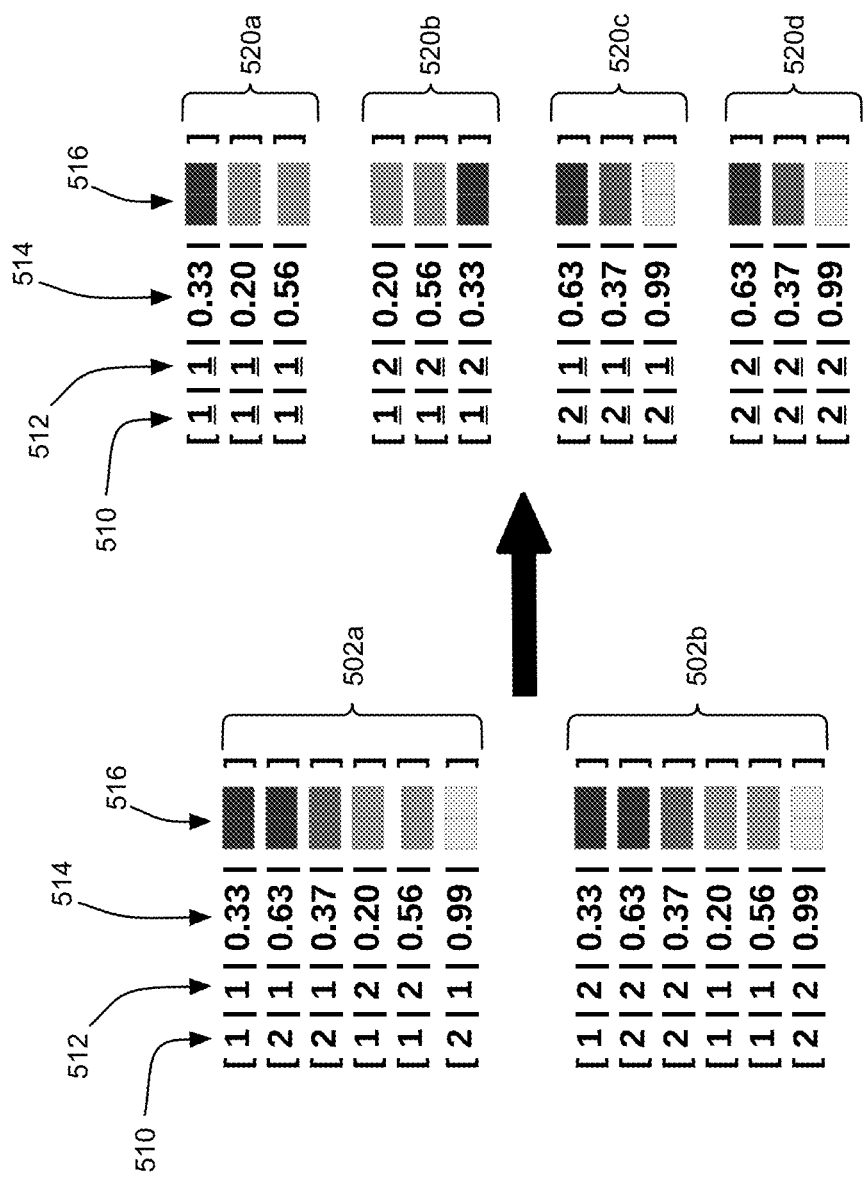
Figure 5D:
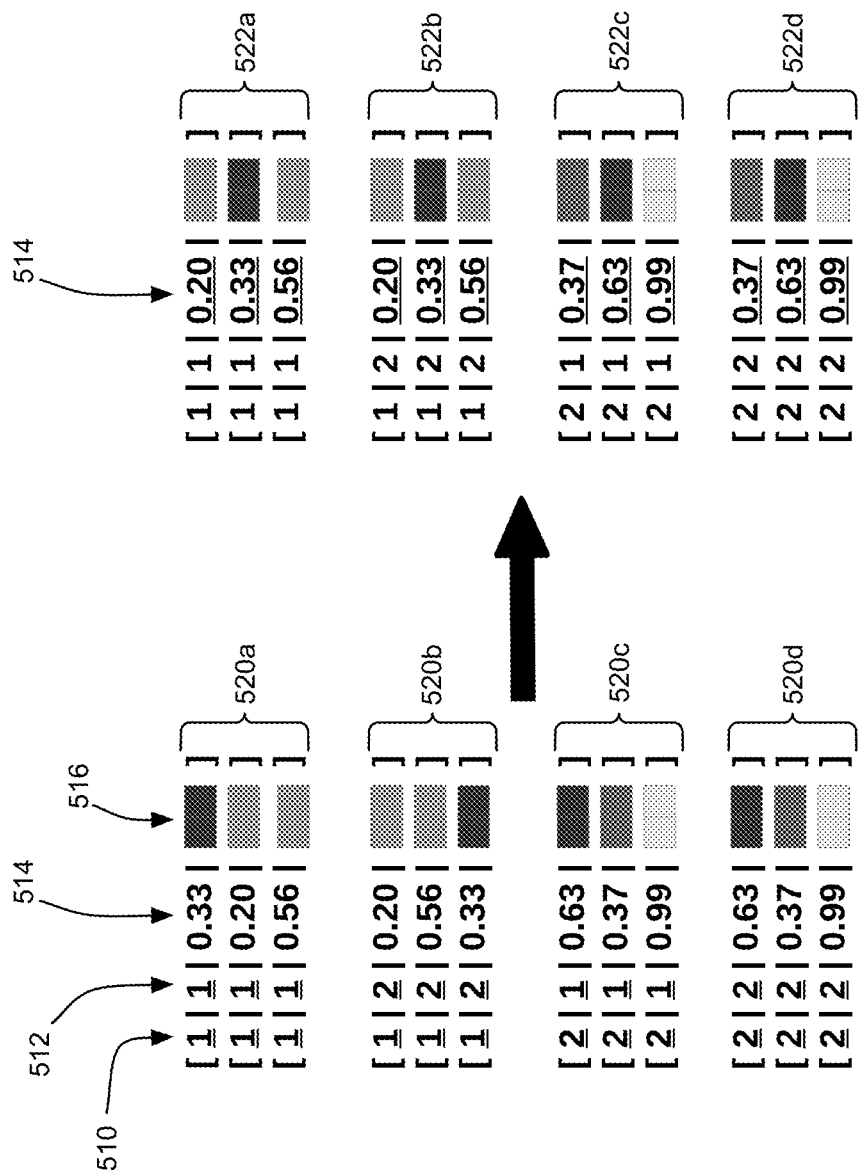

Referring now to FIG. 5C, the emitted records 502 of FIG. 5A have been grouped into groups 520 (comprising group 520a, group 520b, group 520c, and group 520c). As shown in FIG. 5C, grouping the emitted records comprises grouping the emitted records based on the sample matrix identifiers and the vertical block indices of the emitted records.

Thus, in one embodiment, each group 520 may comprise records having the same sample matrix identifiers and vertical block indices. For example, the group 520a includes all records that belong to the first sample matrix (i.e., "1" at sample matrix identifier 510), and have a vertical block index of "1". Similarly, the group 520b includes all records that belong to the first sample matrix (i.e., "1" at sample matrix identifier 510), and have a vertical block index of "2". Still yet, the group 520c includes all records that belong to the second sample matrix (i.e., "2" at sample matrix identifier 510), and have a vertical block index of "1". Finally, the group 520d includes all records that belong to the second sample matrix (i.e., "2" at sample matrix identifier 510), and have a vertical block index of "2".

As discussed in more detail below, every group may contain the row partitions for a column of blocks of a sample matrix. Accordingly, after grouping, every resulting group may contain the data for the column of blocks denoted by vertical block index of the sample matrix denoted by sample matrix identifier. Because column blocks may be processed by different machines, this may ensure that all of the groups contain the respective records in the same order. Failing to guarantee this may result in inconsistent sample matrices.

The groups may then be sorted. In one embodiment, sorting each of the groups of the emitted records comprises sorting each of the groups of the emitted records based on the positions of the emitted records in the group. For example, referring to FIG. 5D, each of the groups 520 (comprising group 520a, group 520b, group 520c, and group 520c) have been sorted into sorted groups 522 (comprising sorted group 522a, sorted group 522b, sorted group 522c, and sorted group 522c, respectively). In particular, each of the sorted groups 522 have been sorted based on the position of the records within the group. For example, the records of the sorted group 522a have been sorted in an ascending order of the values of the positions 514 of the records in the group 520a (i.e., 0.20<0.33<0.56). The sorted groups 522b, 522c, and 522d have been sorted in a similar manner.

Sorting the record groups 520 based on a position field may ensure collection of partial rows in the same order on all machines. In some embodiments, the sorting may be also performed based on a row identifier in order to obtain a unique ordering even when the position values 514 are the same for multiple rows. In this manner, it may be ensured that the records in each sorted group 522 have the same order in which the corresponding rows will later appear in their intended sample matrix.

As an option, one or more participating machines may process a sorted group of records, and form the blocks for a column of blocks of the corresponding sample matrix. An algorithm for processing a sorted group of records, and forming the blocks for a column of blocks of the corresponding sample matrix, according to one specific embodiment, is provided as pseudocode in Table 3. Of course, such pseudocode is provided as an option, and should not be construed as limiting in any manner.

TABLE 3

Input: sorted record group, sample matrix identifier s, vertical block index v
Output: sample matrix blocks written to DFS
allocate buffer block blk with indexes 1, v
for rec ← record group
    add row partition from rec to blk
    if blk is full then
        write blk to DFS location for s
        clear contents of blk
        increment horizontal index of blk
if blk is not empty then
    write blk to DFS location for s As shown in the pseudocode of Table 3, the re-blocking operation may include allocating a single block as buffer, which is then filled with data from the field row partition of incoming records in the sorted order of the records. Whenever the buffer block is completely filled, it may be written to the DFS and cleared. After the buffer block is written to the DFS and cleared, a horizontal index of the buffer block may be incremented. Moreover, in order to handle the case when the final buffer block is not filled, potentially remaining buffered data is written back. Additionally, consecutive row indices may be assigned to the newly formed sample matrices.

Yet another algorithm for processing a sorted group of records, and forming the blocks for a column of blocks of the corresponding sample matrix, according to another specific embodiment, is provided as pseudocode in Table 4. Of course, such pseudocode is provided as an option, and should not be construed as limiting in any manner.

TABLE 4

```
function reblock(sampleID, verticalIndex, recordGroup) {
        # allocate buffer block
        initialHorizontalIndex = 1
        block = new Block(initialHorizontalIndex, verticalIndex)
        for (record in recordGroup) {
                block.addRow(record.partialObservation)
                # write back filled blocks
                if (block.isFull( )) {
                        writeToDFS(block, sampleID, verticalIndex)
                        block.clear( )
                        block.incrementHorizontalIndex( )
                }
        }
        # write remaining block
        if (!block.isEmpty( )) {
                writeToDFS(block, sampleID, verticalIndex)
        }
}
```

Figure 6A:
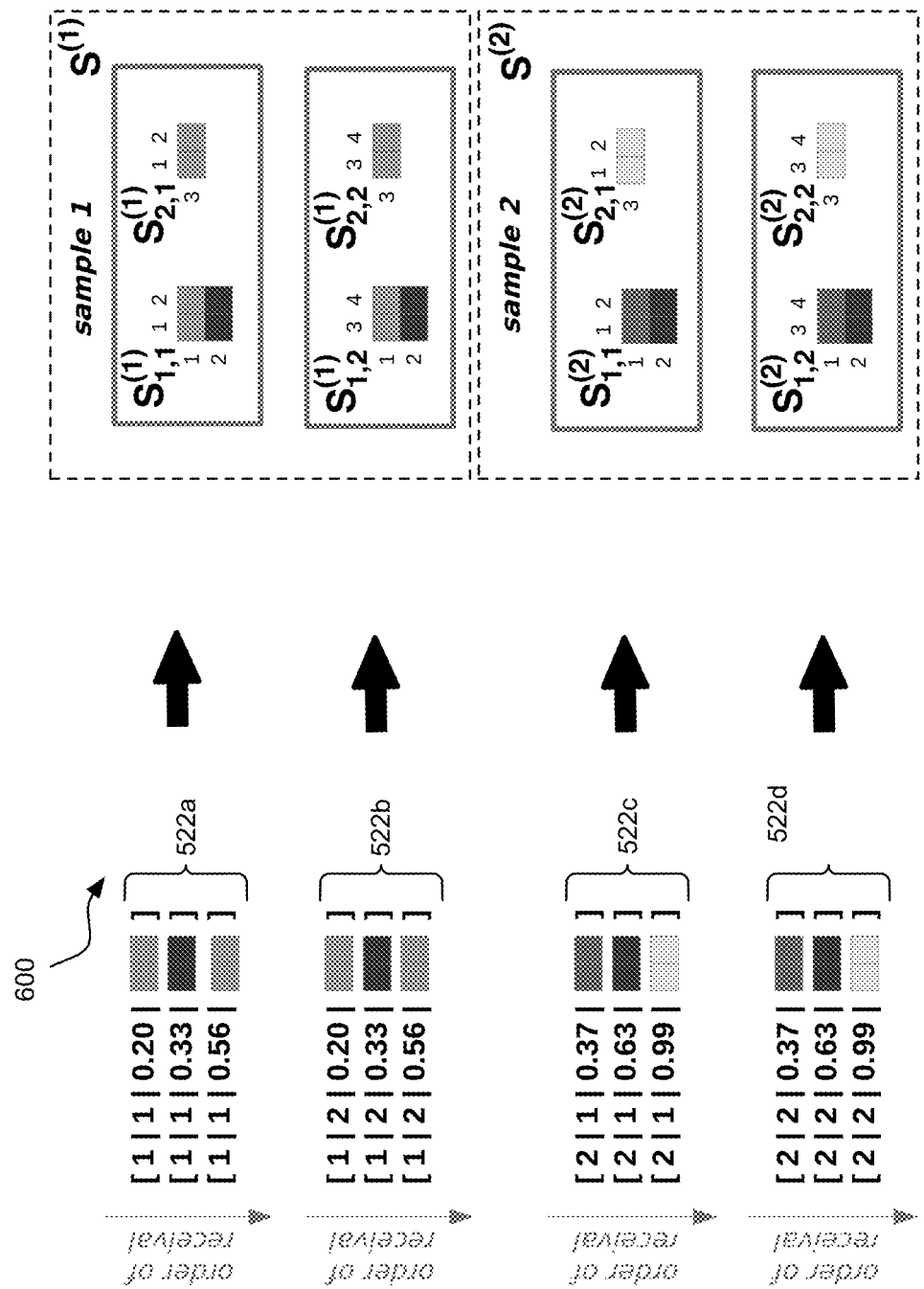
FIGS. 6A-6B illustrate a re-blocking operation generating sample matrices, according to one embodiment.

Referring now to FIG. 6A, an example of a streaming re-block operation 600 is shown. A result of the re-block operation 600 of FIG. 6A, the sorted groups of records 522 of have been transformed into blocked matrices. The blocked matrices together comprise a first sample matrix, $S^{(1)}$, and a second sample matrix, $S^{(2)}$. As shown, every group of sorted records results in a column of blocks of a sample matrix. For example, the sorted group 522a has been transformed into the blocks $S_{1,1}^{(1)}$ and $S_{2,1}^{(1)}$ of the first column of the first sample matrix, $S^{(1)}$. Similarly, the sorted group 522b has been transformed into the blocks $S_{1,2}^{(1)}$ and $S_{2,2}^{(1)}$ of the second column of the first sample matrix, $S^{(1)}$. The remaining sorted groups 522c and 522d similarly form the blocks $S_{1,1}^{(2)}$ and $S_{2,1}^{(2)}$ of the first column, and $S_{1,2}^{(2)}$ and $S_{2,2}^{(2)}$ of the second column, respectively, of the second sample matrix, $S^{(2)}$.

Generation of the sample matrices by re-blocking in this manner may achieve a high degree of parallelism by allowing every column of blocks of every sample matrix to be processed independently. The maximum degree of parallelism of this phase may be the number of sample matrices N to be generated multiplied by the number of column blocks (which equals the number of columns n of the input matrix divided by the block size d). In other words, the maximum degree of parallelism may equal (number of columns of the input data matrix/block size)*(number of samples). Moreover, high memory efficiency may be achieved, as only a single buffer block is necessary to materialize a column block of a sample matrix. Re-blocking in this manner may be executable in the reduce-phase of a MapReduce system.

Figure 6B:
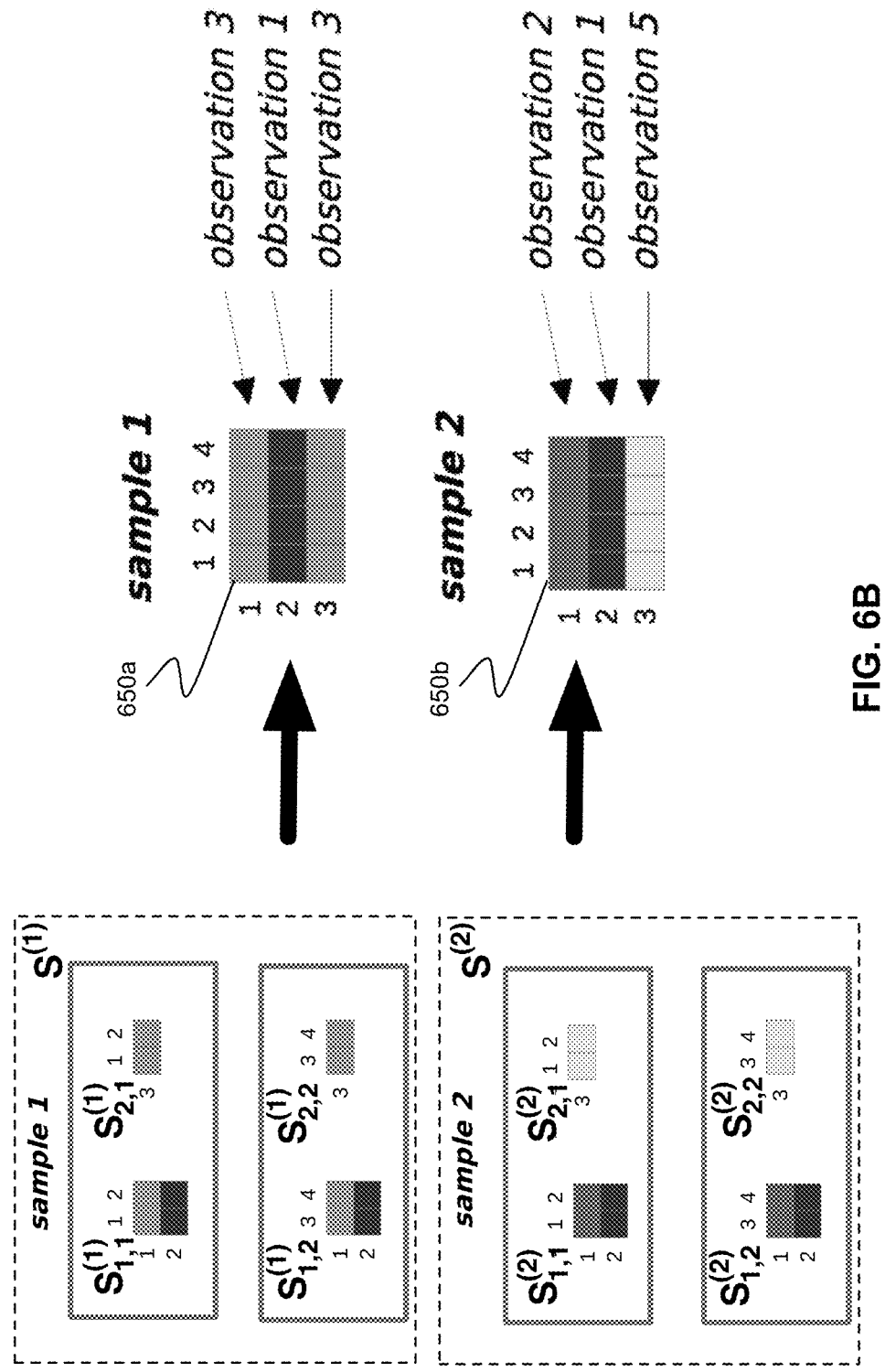

Still yet, referring now to FIG. 6B, sample matrices 650 have been materialized from the blocked matrices. In particular, the sample matrix 650a has been materialized from the first blocked sample matrix, $S^{(1)}$, and the sample matrix 650b has been materialized from the second blocked sample matrix, $S^{(2)}$. As illustrated in FIG. 6B, each of the rows or observations of the sample matrices 650 are sampled from the input matrix 400 of FIG. 4A. As an option, and as shown in FIG. 6B, the sample matrices 650 have been drawn with replacement (e.g., observation 1 is included in both of the first sample matrix 650a and the second sample matrix 650b).

Thus, the input matrix 400 may be sampled with replacement in a manner that does not require the materialization and distribution of an assignment table. Further, a large number of samples may be drawn in parallel, and the sampling may be performed in a distributed manner on all machines holding input matrix blocks of the input matrix. Additionally, the sample matrices 650 may be generated in only a single pass over the data, in a manner that is predictable and uses a constant amount of memory that is in the order of the size of the blocks. Still yet, although the sample matrices may be generated in a distributed manner, any network traffic may be bounded by the aggregate size of the samples blocks to be drawn.

Additionally, in the embodiments described above, there is no need to perform a distributed join between a data matrix and an assignment table, nor a need to re-block a join result.

As noted above, a compute occurrences function may be utilized to compute the occurrences of an observation in the sample matrices. It is contemplated that the compute occurrences function may be implemented in various manners for different sampling techniques and embodiments.

In one embodiment, the compute occurrences function relies on a pseudo random number generator (PRNG) represented by a class RandomGenerator that offers the following methods: seed(long seed) seeds the PRNG, skipTo(int i) skips to the i-th position in a random sequence, and nextRandom( ) generates a number from [0,1] uniformly at random. Still yet, an abstract Sampler class may create the PRNG, and seed it with the same seed on all of the machines to which input matrix blocks were distributed.

An algorithm for creating a PNRG and seeding it with the same seed on all machines, according to one specific embodiment, is provided as pseudocode in Table 5. Of course, such pseudocode is provided as an option, and should not be construed as limiting in any manner.

TABLE 5

```
abstract class Sampler {
    RandomGenerator prng
    Sampler(long seed) {
        prng = new RandomGenerator( )
        prng.seed(seed)
    }
    abstract function compute_occurrences(observationID)
}
```

Accordingly, a PRNG may generate a sequence of values $p_0, p_1, p_2, \ldots$ that are approximately uniformly distributed, where the generation is initialized with a seed, and may use a recursive transition function, $\varphi$, such that $p_i = \varphi(p_i - 1)$.

As noted, consistent results may be obtained by using the same seed on all machines. This ensures all PRNGs produce the exact same random sequence. In addition, a unique index of a row may be used as the position to jump to in the random sequence. For example, for a row with index j, sampling must leverage the j-th element, $p_j$, from the produced random sequence. This method will provide consistent results when partitions of row j are processed in parallel on different machines. As an option, a special class of PRNGs may be used that enable directly skipping to an arbitrary position in the random sequence. These PRNGs allow the direct computation of the random element $p_j$ with a function $\hat{\varphi}(s,j)$ via the seed s and the position j.

In one embodiment, the input dataset may be utilized for performing a hold-out test. In such an embodiment, the input matrix may be partitioned into training-set data and test-set data. A hold-out test may be useful for training a machine learning model on the training-set data, and then evaluating the quality of a prediction model on the unseen test-set data.

As an option, the input matrix may be partitioned into the training-set data and the test-set data using a fraction. This may randomize the order inside of the partitions. Further, performing a hold-out test may utilize sampling without replacement. Accordingly, each row of the input matrix may be included in the training-set data or the test-set data, but not both. To determine whether a given row with index j is included in the training-set data or the test-set data, a random number generator may skip to the position j in its random sequence to ensure reproducible results. Next, a random number between zero and one may be generated from the random number generator, and compared to a user-defined train/test ratio to decide whether the row occurs in the training-set or the test-set. An algorithm for determining whether a given row is included in training-set data or test-set data, according to one specific embodiment, is provided as pseudocode in Table 6. Of course, such pseudocode is provided as an option, and should not be construed as limiting in any manner.

TABLE 6

```
class HoldoutSampler extends Sampler {
    int TRAININGSET_ID = ...
    int TESTSET_ID = ...
    double TRAINING_FRACTION = ...
    function compute_occurrences(observationID) {
        # skip to fixed position in random sequence
        prng.skipTo(observationID)
        # generate random number
        double randomNumber = prng.nextRandom( )
        # decide assignment to training-set or test-set
        if (randomNumber <= TRAINING_FRACTION) {
            return new Occurrence(TRAININGSET_ID,
                randomNumber)
        } else {
```

TABLE 6-continued

```
            return new Occurrence(TESTSET_ID,
                randomNumber)
        }
    }
}
```

In yet another embodiment, the input dataset may be utilized for performing a series of hold-out tests. In other words, training-sets and test-sets may be created at the same time for several different hold-out tests. This may improve the estimate of the prediction quality. This may be accomplished by repeating the approach of generating a random number, and using this number to determine the occurrence of a row in the training set or test set w times. To obtain w random numbers, and ensure that every position in the random sequence is used only for a single row (to ensure that the results are uncorrelated), for each row index $j \in \{1, \ldots, m\}$ (where m is the number of rows of the input matrix), rng may be skipped to the position $(j-1)*w$ in its random sequence, and the subsequent w random numbers may be used for the current invocation to determine the occurrences of the row j. As an option, only a subset of the input matrix may be used for the data-set and training-set by scaling down the train/test ratios and ignoring non-matching rows.

An algorithm for determining whether a given row is included in training-set data or test-set data for a series of hold-out tests, according to one specific embodiment, is provided as pseudocode in Table 7. Of course, such pseudocode is provided as an option, and should not be construed as limiting in any manner.

TABLE 7

```
class HoldoutSeriesSampler extends Sampler {
    int NUM_TESTS = ...
    int[ ] TRAININGSET_IDS = { ... }
    int[ ] TESTSET_IDS = { ... }
    double TRAINING_FRACTION = ...
    function compute_occurrences(observationID) {
        # skip to fixed position in random sequence
        prng.skipTo(observationID)
        occurrences = new Set( )
        for (int test = 0; test < NUM_TESTS; test++) {
            # generate a random number
            double randomNumber = prng.nextRandom( )
            # decide assignment to current training-set or test-set
            if (randomNumber <= TRAINING_FRACTION) {
                occurrences.add(new
                    Occurrence(TRAININGSET_IDS[test],
randomNumber))
            } else {
                occurrences.add(new
                    Occurrence(TESTSET_IDS[test], randomNumber))
            }
        }
        return occurrences
    }
}
```

In one embodiment, k-fold cross validation may be applied. As an option, k-fold cross validation may be utilized as a meta learning technique, where a single partition is used as a test-set, and training is performed on the remaining k−1 partitions. Further, this may be repeated k times, until every partition has been utilized as the test-set once.

When k-fold cross validation is employed, the input matrix may be partitioned randomly into k partitions. Further, an order inside of the partitions may be randomized, and then sampled without replacement to generate sample matrices.

A straightforward implementation of k-fold cross-validation may directly create k training-sets and tests for the k rounds of k-fold cross-validation. Similar to the other implementations discussed above, the random number generator may be skipped to the position in a random sequence denoted by the row index j. Next, a random number may be generated between 0 and 1, and a target fold f for the row is computed from the random number. Then, the function emits k occurrences of the row: it occurs in the test set of the f-th round, and in the k−1 training sets of all other rounds. However, this straightforward implementation may be problematic as it creates k copies of the input data, which may present a performance and scalability bottleneck.

In another implementation, which may be referred to herein as dynamic sample matrix composition for k-fold cross validation, these issues and other issues may be avoided. In dynamic sample matrix composition for k-fold cross validation, the non-fully filled bottom blocks of each generated sample matrix are copied to a predetermined location in the distributed filesystem, and then an additional matrix is created per training set from those blocks. Finally, only the full blocks of the sample matrices, and the additionally created matrix as one large composed matrix, are read, thereby neglecting the non-fully filled blocks. Dynamic sample matrix composition requires only a single copy of the input matrix, plus k additional small matrices consisting of at most k−1 blocks. With dynamic sample matrix composition, k-fold cross-validation may be implemented with a very simple user-defined function that only triggers a single occurrence of each row, as shown below in Table 8. After computing the fold f for the row with index n, a single occurrence of fold f is emitted in the sample matrix.

An algorithm for implementing k-fold cross-validation utilizing dynamic sample matrix composition, according to one specific embodiment, is provided as pseudocode in Table 8. Of course, such pseudocode is provided as an option, and should not be construed as limiting in any manner.

TABLE 8

```
class KfoldSampler extends Sampler {
    # number of partitions to generate
    int K = ...
    function compute_occurrences(observationID) {
        # skip to fixed position in random sequence
        prng.skipTo(observationID)
        # generate a random number
        double randomNumber = prng.nextRandom( )
        # choose partition from the random number
        int partitionID = (int) (randomNumber * K)
        return new Occurrence(partitionID, randomNumber)
    }
}
```

In another embodiment, bagging may be applied. As an option, bagging may be utilized as a meta learning technique to train machine learning models on samples. With bagging, predictions of the machine learning models may be combined to build a strong model. This may be referred to as ensemble learning.

When bagging is employed, sample matrices of a given size may be drawn from the input matrix, and the input matrix may be sampled with replacement to generate the sample matrices. Further, an order inside of the sample matrices may be randomized.

In yet another embodiment, a single component of a multinomial random variate may be computed in isolation with constant memory requirements. A multinomial is partitionable by conditioning on the totals of subsets of its components. Let $r=(r_1, \ldots, r_m)$ be a random variate from the multinomial distribution $M_m(s; p_1, \ldots, p_n)$ and let $$z = \sum_{j=1}^{i} r_j$$

be the sum of the first i components of r. By fixing z, the sum of the remaining components, $$\sum_{j=i+1}^{n} r_j,$$

is fixed as s−z. The left partition $(r_1, \ldots, r_i)$ then follows the multinomial distribution $$M_i\left(z; \frac{p_1}{p_l}, \ldots, \frac{p_i}{p_l}\right) \text{ with } p_l = \sum_{j=1}^{i} p_j.$$

Analogously, the right partition follows the multinomial distribution $$M_{m-i}\left(s-z; \frac{p_{i+1}}{p_n}, \ldots, \frac{p_n}{p_r}\right) \text{ with } p_r = \sum_{j=i+1}^{n} p_j.$$

The generation of the cumulative sum z necessary for the partitioning can be conducted by sampling a binomial distribution:

$$z = \sum_{j=1}^{i} r_j \sim B\left(s, \sum_{j=1}^{i} p_j\right).$$

This property may be used to define a recursive algorithm that generates the components of a multinomial random variate in parallel in a distributed setting.

The following operations may be performed to determine the component $r_n$ of a multinomial random variate r of size t with equally probable outcomes $(p_1, \ldots, p_m)$. First, the middle index of the current partition in the current random variate is determined. A random number generator may be skipped to this index to get repeatable results when processing this partition on different machines. Next, a binomial distribution is sampled to determine how many occurrences to assign to the left and right side of the current partition. Finally, the function is recursively invoked for the left and right side of the current partition, depending on the index j of the component being computed. The algorithm terminates when a single element partition is reached (the component searched for), or when the current partition is assigned zero occurrences.

An algorithm for generating the components of a multinomial random variate in parallel in a distributed setting, according to one specific embodiment, is provided as pseudocode in Table 9. Of course, such pseudocode is provided as an option, and should not be construed as limiting in any manner.

TABLE 9

```
function sample_multinomial(component, start, end, numOccurrences) {
    # check for termination
    if (start == end || numOccurrences == 0) {
        return numOccurrences
    }
    # compute partition sizes and middle
    size = end - start + 1
    sizeLeft = round(size / 2)
    mid = start + sizeLeft - 1
    # skip to fixed position in random sequence
    prng.skipTo(mid)
    # sample totals of left partition from a binomial
    numOccurrencesLeft =
            binomial_rand(prng, numOccurrences, (sizeLeft / size))
    # recurse into left or right partition
    if (component <= mid) {
        return sample_multinomial(component, start, mid,
            numOccurrencesLeft)
    } else {
        return sample_multinomial(component, mid + 1, end,
numOccurrences - numOccurrencesLeft)
    }
}
```

This approach may enable the computation of a multinomial random variate in a distributed, parallel fashion with constant memory requirements and without any inter-machine communication. However, in contrast to sequential techniques, which require only a single sample per component, this approach does require a logarithmic number of samples from binomials per component.

In another embodiment, runtime may be improved by caching sampling results from early invocations for large partitions that have to be computed for many components. A user-defined sampling function for generating bootstrap samples may directly invoke the recursive function sample_multinomial (see Table 9) to determine the number of occurrences of a row with index j in the bootstrap sample. The PRNG may be skipped-ahead to the position j*s, where j∈{1, ..., m} is a row index and s is the desired sample size. This leaves the first s positions in the random sequence for the computation of the number of occurrences, and another s positions for generating random numbers for the relative position values of the occurrences of row j.

An algorithm for a user-defined sampling function for bootstrap sampling, according to one specific embodiment, is provided as pseudocode in Table 10. Of course, such pseudocode is provided as an option, and should not be construed as limiting in any manner.

TABLE 10

```
Input: row index j, random number generator rng, params: number of rows m,
sample matrix size s
Output: tuples occs: occurrences in bootstrap sample
occs ← ∅
t ← sample multinomial( j, 0, m, s, rng )
skip ahead to position j * s in rng
    for 1... t
        r ← random number generated by rng
        add occurrence at position r to occs
return occs
```

The special case of block-partitioning of the input matrix gives rise to even further performance improvements. Every machine processes the data one block at a time, where a block contains a large number of rows (e.g., 1000 by default in SystemML). This may be leveraged by an approach that uses only a single partitioning step. In particular, by first creating a random variate r̂ from the multinomial distribution $M_b(s;p_b)$, where b equals the number of blocks to consider (number of rows/block size) and a probability vector $p_b$ assigns probabilities proportional to the number of rows per block. A component $\hat{r}_h$ holds the totals of the components of r corresponding to the rows included in the block with horizontal index h. A fast sequential algorithm may generate r̂ on every machine in the cluster. When the first row of an input matrix block is encountered, a temporary random variate of dimensionality 1 and cardinality $\hat{r}_h$ is generated, where 1 is the number of rows contained in the current input matrix block and h is the horizontal index of that input matrix block. This random variate contains the number of occurrences for every row of the current input matrix block, and only is kept in memory until the current input matrix block is processed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
identifying an input dataset formatted as an input matrix;
dividing the input matrix into a plurality of input matrix blocks;
sampling at least two of the input matrix blocks, including:
reading each sampled input matrix block by iterating over partitions of the sampled input matrix block,
for each of the partitions of the sampled input matrix block, determining occurrences of the partition in at least one sample matrix, and
for each occurrence of one of the partitions in the at least one sample matrix, emitting a record; and generating at least one sample matrix, including:
  grouping the emitted records,
  sorting each of the groups of the emitted records, and
  re-blocking each of the sorted groups of the emitted records.

2. The computer-implemented method of claim 1, wherein the partitions comprise one of rows and columns.

3. The computer-implemented method of claim 1, wherein each of the emitted records includes a sample matrix identifier that identifies a particular sample matrix of the at least one sample matrix, a vertical block index, a position, and a partial observation.

4. The computer-implemented method of claim 1, wherein the emitted records are grouped based on sample matrix identifiers and vertical block indices of the emitted records.

5. The computer-implemented method of claim 1, wherein each of the groups of the emitted records is sorted based on positions of the emitted records in the group.

6. The computer-implemented method of claim 1, wherein the at least one sample matrix is generated based on the re-blocking of the sorted groups of the emitted records.

7. A computer program product for performing single-pass distributed sampling from block-partitioned matrices, the computer program product comprising a computer readable storage medium having program instructions embodied therewith, the program instructions executable by a processor to cause the processor to:
  identify, by the processor, an input dataset formatted as an input matrix;
  divide, by the processor, the input matrix into a plurality of input matrix blocks;
  sampling, by the processor, at least two of the input matrix blocks, including:
    reading each sampled input matrix block by iterating over partitions of the sampled input matrix block,
    for each of the partitions of the sampled input matrix block, determining occurrences of the partition in at least one sample matrix, and
    for each occurrence of one of the partitions in the at least one sample matrix, emitting a record; and
  generate, by the processor, at least one sample matrix, including:
    grouping the emitted records,
    sorting each of the groups of the emitted records, and
    re-blocking each of the sorted groups of the emitted records.

8. The computer program product of claim 7, wherein the partitions comprise one of rows and columns.

9. The computer program product of claim 7, wherein each of the emitted records includes a sample matrix identifier that identifies a particular sample matrix of the at least one sample matrix, a vertical block index, a position, and a partial observation.

10. The computer program product of claim 7, wherein the emitted records are grouped based on sample matrix identifiers and vertical block indices of the emitted records.

11. The computer program product of claim 7, wherein each of the groups of the emitted records is sorted based on positions of the emitted records in the group.

12. The computer program product of claim 7, wherein the at least one sample matrix is generated based on the re-blocking of the sorted groups of the emitted records.

13. A system, comprising:
  one or more processors and logic integrated with the processors, executable by the processors, or integrated with and executable by the processors, the logic being configured to:
  identify an input dataset formatted as an input matrix;
  divide the input matrix into a plurality of input matrix blocks;
  sample at least two of the input matrix blocks, including:
    reading each sampled input matrix block by iterating over partitions of the sampled input matrix block,
    for each of the partitions of the sampled input matrix block, determining occurrences of the partition in at least one sample matrix, and
    for each occurrence of one of the partitions in the at least one sample matrix, emitting a record; and
  generate at least one sample matrix, including:
    grouping the emitted records,
    sorting each of the groups of the emitted records, and
    re-blocking each of the sorted groups of the emitted records.

14. The system of claim 6, wherein the partitions comprise one of rows and columns.

15. The system of claim 13, wherein each of the emitted records includes a sample matrix identifier that identifies a particular sample matrix of the at least one sample matrix, a vertical block index, a position, and a partial observation.

* * * * *